US006524994B1

(12) United States Patent
Reesink et al.

(10) Patent No.: US 6,524,994 B1
(45) Date of Patent: Feb. 25, 2003

(54) NICKEL CATALYST

(75) Inventors: Bernard Hendrik Reesink, Doorn (NL); Nico van Gasteren, Houten (NL)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/763,846

(22) PCT Filed: Aug. 27, 1999

(86) PCT No.: PCT/NL99/00534

§ 371 (c)(1),
(2), (4) Date: May 1, 2001

(87) PCT Pub. No.: WO00/12210

PCT Pub. Date: Mar. 9, 2000

(30) Foreign Application Priority Data

Aug. 28, 1998 (EP) ............................................ 98202878

(51) Int. Cl.[7] ........................... B01J 23/00; B01J 23/40; B01J 23/42; C10G 35/06; C10G 45/04
(52) U.S. Cl. ...................... 502/337; 502/327; 502/332; 502/335; 208/142; 208/217
(58) Field of Search ................................ 502/327, 332, 502/335, 337; 208/142, 217

(56) References Cited

U.S. PATENT DOCUMENTS

| | | | |
|---|---|---|---|
| 3,933,883 A | * 1/1976 | Parthasarathy | ......... 260/449 M |
| 4,010,025 A | 3/1977 | Fraioli et al. | |
| 4,588,709 A | * 5/1986 | Morales et al. | ............. 502/314 |
| 4,990,243 A | * 2/1991 | Winslow et al. | ........ 208/254 H |
| 5,389,595 A | * 2/1995 | Simpson et al. | ............ 502/315 |
| 5,403,806 A | * 4/1995 | Simpson | ...................... 502/211 |
| 5,856,603 A | * 1/1999 | Rekker et al. | .............. 585/270 |

FOREIGN PATENT DOCUMENTS

| | | |
|---|---|---|
| EP | 0 167 201 A | 1/1986 |
| EP | 0 168 091 A | 1/1986 |

* cited by examiner

*Primary Examiner*—Stanley S. Silverman
*Assistant Examiner*—Cam N. Nguyen
(74) *Attorney, Agent, or Firm*—Weingarten, Schurgin, Gagnebin & Lebovici LLP

(57) ABSTRACT

A nickel catalyst comprising 0.1 to 12.5 wt. % of at least one structural promoter, selected from the group of oxides of metals and metalloids and combinations thereof, and 87.5 to 99.9 wt. % nickel, calculated on the weight of nickel and the structural promoter together, the catalyst having an nickel surface area, as defined herein, of at least 10 m$^2$/g catalyst and an average pore diameter, as defined herein, of 10 to 60 nm. It has been found that already very small amounts of promoter improves the structure of the catalyst. High amounts still provide a stable, sinter resistant material, but result in a decrease in the pore size to lower levels. Furthermore, properties and sulfur uptake capacity.

20 Claims, No Drawings

NICKEL CATALYST

FIELD OF THE INVENTION

The invention is directed to a nickel catalyst, more in particular to a nickel catalyst mainly consisting of nickel, with very advantageous structural properties.

BACKGROUND OF THE INVENTION

Nickel catalysts have been used already for a long time in various catalytic applications, such as hydrogenation and desulfurization. Traditionally either supported nickel catalysts or so-called Raney nickel catalysts are used. The supported catalyst are generally based on a ceramic support, such as silica, alumina and the like, on the surface of which an amount of nickel is present. These amounts of nickel may vary widely, from as low as 5 wt. % up to amounts of more than 75 wt. %. Supported catalysts have the advantage that it is relatively easy to provide a suitable catalyst structure. By first structuring the support, before applying the active material, it is possible to maintain the structure of the support. This applies especially to catalysts having a not too high nickel loading. At loadings of over about 75 wt. %, it becomes increasingly difficult to provide a suitable catalyst structure, more in particular to provide a catalyst having a reasonably high nickel surface area in combination with large pores. This would, however, be highly desirable as catalysts having the combination of these properties are expected to be highly active and selective in various reactions. Furthermore, catalysts with such a high nickel content have a high capacity for sulfur uptake in desulfurisation systems and generally have a good sedimentation behaviour. This latter point is especially important in reactions that are carried out in the slurry phase, such as hydrogenations of fatty materials.

Quite often, highly loaded supported nickel catalysts have the disadvantage that at high temperatures during reduction, calcination or use the nickel sinters to large crystallites, thereby losing surface area.

An alternative for the supported nickel catalysts is Raney nickel. Raney nickel has a high nickel content, i.e. more than 90 wt. %, but the pore sizes of Raney nickel tend to be rather small, namely typically between 4.5 and 6.5 nm, and the total pore volume is typically about 0.15 ml/g.

When seeking to produce nickel catalysts with as high as possible nickel content, an obvious solution would be to prepare unsupported nickel catalysts, for example by precipitating nickel precursor from a suitable solution of a nickel salt. This does not result in a stable (i.e. sinter resistant) material that can be converted to a catalyst having a high nickel surface area. Even if the nickel precursor (e.g. nickel-carbonate) has a high BET surface area, after calcination and reduction the material has sintered to a dramatically low nickel surface area, which may be as low as about 1 $m^2$/g.

Accordingly there is a need for nickel catalysts having a high nickel loading and a high nickel surface area, combined with good structural properties, i.e. wide pores and a high porosity (pore volume), which also have the advantages of good sedimentation and high sulfur capacity.

BRIEF SUMMARY OF THE INVENTION

The present invention is based on the surprising discovery that the use of only a small amount of a structural promoter in the preparation of high nickel content catalysts makes it possible to produce nickel catalysts having a high nickel loading, a good nickel surface area in combination with good sinter resistance and wide pores.

The invention is accordingly directed to a nickel catalyst comprising 0.1 to 12.5 wt. % of at least one structural promoter, selected from the group of oxides of metals and metalloids and combinations thereof, and 87.5 to 99.9 wt. % of nickel, calculated on the weight of nickel and the structural promoter together, the catalyst having an nickel surface area, as defined herein, of at least 10 $m^2$/g catalyst and an average pore diameter, as defined herein, of 10 to 60 nm.

It has been found that already very small amounts of promoter improves the structure of the catalyst. High amounts still provide a stable, sinter resistant material, but result in a decrease in the pore size to lower levels. Furthermore, these high amounts result in decreased sedimentation properties and sulfur uptake capacity.

DETAILED DESCRIPTION OF THE INVENTION

The structural promoter can be any material that provides a binding, structure promoting effect on the catalyst. More in particular, oxides of metal and metalloids are suitable, such as silica, silica-alumina, alumina, zirconia, titania, magnesia or ceria. Preferred materials are alumina, silica and silica-alumina. In the case of alumina it is preferred to use amounts, calculated on the weight of nickel (metal) and alumina of not more than 6.35 wt. %. Higher amounts are not necessary and may lead to a decrease in pore size. Most preferred amounts for the structural promoter are up to 5 wt. %. These amounts provide the possibility of a very high nickel loading in a stable material, in combination with the very advantageous pore structure.

The structural promoter is included in the catalyst during the preparation thereof, for example by adding the structural promoter during or after the precipitation of nickel precursor, such as nickel carbonate. An especially suitable method comprises first precipitating the nickel precursor, ageing the precipitate and adding a solution or suspension of the (precursor) of the structural binder to the precipitate, optionally followed by further ageing. Subsequently the material is further treated to produce a catalyst, which may include drying, calcining, reducing and passivating. These steps are conventional in the preparation of nickel catalysts.

Suitable sources for the structural promoter that may be added during the preparation of the catalyst are clay, metasilicate, colloidal silica, waterglass and sililic acid ether.

The type of material used as (precursor for) the structural promoter depends on the required properties of the catalyst. In the first place the structural promoter may influence the acid-base properties of the catalyst. In this way it is possible to provide a catalyst having more acidic properties by using a clay binder as promoter. Such a catalyst may have a very good selectivity in the hydrogenation of unsaturated fatty nitrils to produce unsaturated fatty amines, without substantial hydrogenation of the unsaturation.

On the other hand it is also possible to provide a more alkaline catalyst, for example by using a silicate solution as precursor for the structural promoter. Such a catalyst has a better selectivity than Raney nickel towards primary amines in the hydrogenation of fatty nitrites.

The nickel surface area of the catalyst will generally be between 10 and 65 $m^2$/g of catalyst. To determine the nickel surface area hydrogen chemisorption measurements are performed with a dynamic pulse method similar to that described and discussed by Wanke et.al. (Can. J. Chem. Eng. vol 59, June 1981, 357). From the hydrogen chemisorption the nickel surface area is calculated according to a method as described by Bartholomew et.al. (*Journal of Catal.* 65 (1980) 390).

The BET surface area, as determined by single point adsorption using the BET equation (as e.g. described by G. Sandstede et.al., *Chem. Ing. Tech.* 32 (1960), 413), is in general at least 15 m$^2$/g catalyst. This surface area will generally be up to about 100 m$^2$/g.

An important aspect of the catalyst is the pore structure. The advantageous pore structure of the catalyst of the present invention is characterised by wide pores in combination with a good porosity. The average pore diameter of the catalyst is at least 10 nm, preferably between 10 and 60 nm. This average pore diameter is calculated from the pore volume by the formula PV*4000/SA, in which PV is the pore volume as defined underneath, and SA is the single point BET surface area. For example for silica containing materials, this is quite contrary to the usual pore size of 4 nm. At higher amounts of structural promoter, these typical values are found again. In this respect it is to be noted that the macropore size does not play a role in this, which is also confirmed by the use of nitrogen physisorption for defining the average pore diameter. This method only determines pore diameters up to about 60 nm. On the basis of structural analysis of the catalyst it has been determined that the best definition of the shape of the pores is a cylindrical shape. Accordingly the model for determining the average pore diameter was based on this shape.

The other aspect of the structure of the catalyst is the pore volume. This pore volume is the pore volume as determined with nitrogen physisorption for pores smaller than 60 nm, and will be generally be at least 0.2 ml/g of catalyst, more in particular be between 0.2 and 1.0 ml/g of catalyst. Within these ranges a mechanically strong material is obtained, having good accessibility for the reactants, without undue diffusion restrictions. The required values for both the pore volume and the average pore diameter can be obtained by careful selection of the production conditions, including choice of promoter, precipitation conditions, ageing conditions and the like.

The catalyst of the invention may be based on nickel only, or may contain minor amounts (less than 2.5 wt. % on nickel) of one or more promoting metals. It is also possible to use the catalyst in sulfided form, for example for the desulfurisation of solvents.

The catalyst of the invention may be used for all kinds of reactions for which nickel catalyst are being used, including both supported and Raney nickel catalysts. Examples thereof are the various hydrogenation reactions, such as hydrogenation of fatty nitrils to amines, hydrogenation of aromatic nitro compounds to produce i.a. aniline, hydrogenation of acids and aldehydes, hydrogenation of solvents and resins, desulfurisation reactions, such as desulfurisation of solvents, dehydrogenation reactions and the like.

The invention is further elucidated on the basis of some examples.

EXAMPLE 1

A nickel catalyst is prepared according to the following steps:
A. the following solutions are prepared:
  2.1 dm$^3$ sodium carbonate solution, by dissolving 258 g. anhydrous sodium carbonate in demineralized water.
  1 dm$^3$ nickel chloride solution, by dissolving 405 g. NiCl$_2$.6H$_2$O in demineralized water.
B. The sodium carbonate solution is heated to 55° C. in a 5 dm$^3$ vigorously stirred stainless steel vessel in which baffles are installed to provide good agitation. Within a period of 1.5 hours the nickel solution is dosed into the sodium carbonate solution. The final pH of solution is between 7.5 and 7.8.
C. After dosing the nickel chloride, the temperature of the slurry is elevated to 90° C., at which it is aged for 1 hour.
D. The slurry is filtered, and the filter cake washed until the conductivity of the wash water is under 350 μS. The filtercake is dried at 110° C. for 16 hours. The dried cake is milled and calcined at 410° C. for 2 hours.
E. Portions of 50 g. of the calcined material are reduced for 2.5 hours at 375° C. in a tubular reactor under a hydrogen flow of 5 1/min. After reduction the reactor is allowed to cool, and the catalyst is carefully passivated with air.

The properties of the material prepared as described above are to be found in table 1.

EXAMPLE 2

A nickel catalyst containing a structural promoter is prepared by following step A to E as mentioned in example 1, with the following changes in step A and C:
A. Besides the 2 solutions mentioned in example 1, in step A also the following solution is prepared:
  30 ml sodium silicate solution, by diluting 4.7 g Waterglass (27 wt. % SiO$_2$, SiO$_2$/Na$_2$O weight ratio is 3.3) with demineralized water.
C. In the last 10 minutes of the ageing period, the silicate solution as mentioned in step A is added to the slurry.

The properties of the material prepared as described above are to be found in table 1.

EXAMPLE 3

A nickel catalyst containing a structural promoter is prepared by following step A to E as mentioned in example 1, with the following changes in step A and C:
A. Besides the 2 solutions mentioned in example 1, step B. also the following solution is prepared:
  30 ml sodium silicate solution, by diluting 9.4 g Waterglass (27 wt. % SiO$_2$, SiO$_2$/Na$_2$O weight ratio is 3.3) with demineralized water.
C. In the last 10 minutes of the ageing period, the silicate solution as mentioned in step A is added to the slurry.

The properties of the material prepared as described above are to be found in table 1.

TABLE 1

| Example | 1 | 2 | 3 |
|---|---|---|---|
| SiO$_2$ addition (wt. % rel. to NiO) | — | 1 | 2 |
| Surface area (m$^2$/g) | 4 | 25 | 48 |
| N$_2$ pore volume (ml/g) | — | 0.16 | 0.20 |
| Average pore diameter (nm, calculated: 4000*PV/SA) | — | 26 | 17 |
| Cryst size (nm; from XRD) | 70 | 16 | 12 |
| Nickel surface area (m$^2$/g catalyst) | 3 | 16 | 24 |

What is claimed is:
1. Nickel catalyst comprising 0.1 to 12.5 wt. % of at least one structural promoter selected from the group consisting of oxides of metals, metalloids, and combinations thereof, and 87.5 to 99.9 wt. % of nickel, calculated based on the total weight of nickel and the structural promoter, wherein the catalyst having a nickel surface area of at least 10 m$^2$/g and an average pore diameter of 10 to 60 nm.

2. Nickel catalyst according to claim 1, wherein the structural promoter is silica, silica-alumina, alumina, zirconia, titania, magnesia or ceria.

3. Nickel catalyst according to claim 2, wherein the structural promoter is alumina.

4. Nickel catalyst according to claim 3, wherein the amount of alumina is between 0.1 and 6.35 wt. %.

5. Nickel catalyst according to claim 4, wherein:
   the amount of structural promoter is from 0.2 to 5 wt. %;
   the nickel surface area is between 10 and 65 m$^2$/g;
   the structural promoter is derived from clay, metasilicate, colloidal silica, waterglass or sililic acid ether;
   the BET surface area is at least 15 m$^2$/g;
   at least 80% of the nickel atoms is present in the metallic form; and
   the structural promoter provides acidic or alkaline properties to the catalyst.

6. Nickel catalyst according to claim 2, wherein the structural promoter is derived from clay, metasilicate, colloidal silica, waterglass or sililic acid ether.

7. Nickel catalyst according to claim 2, wherein the structural promoter is silica or silica-alumina.

8. Nickel catalyst according to claim 1, wherein the amount of structural promoter is from 0.2 to 5 wt. %.

9. Nickel catalyst according to claim 1, wherein the nickel surface area is between 10 and 65 m$^2$/g.

10. Nickel catalyst according to claim 1, wherein the BET surface area is at least 15 m$^2$/g.

11. Nickel catalyst according to claim 1, wherein at least 80% of the nickel atoms is present in the metallic form.

12. Nickel catalyst according to claim 1, wherein the structural promoter provides acidic or alkaline properties to the catalyst.

13. A process wherein a catalyst according to claim 1 is contacted with a substrate, wherein said substrate is selectively hydrogenated.

14. The process of claim 13, wherein said structural promoter provides acidic or alkaline properties to said catalyst.

15. The process of claim 13, wherein said structural promoter is alumina and wherein:
   the amount of structural promoter is from 0.2 to 5 wt. %;
   the nickel surface area is between 10 and 65 m$^2$/g catalyst;
   the structural promoter is derived from clay, metasilicate, colloidal silica, waterglass or sililic acid ether;
   the BET surface area is at least 15 m$^2$/g;
   at least 80% of the nickel atoms is present in the metallic form;
   the structural promoter provides acidic or alkaline properties to the catalyst.

16. The process of claim 13, wherein said substrate is selected from the group consisting of fatty nitrils, aromatic nitro compounds, acids, aldehydes, solvents, resins and fatty materials.

17. The process of claim 16, wherein said substrate is a fatty material and said hydrogenation is carried out in a slurry phase.

18. A process wherein a catalyst according to claim 1 is contacted with a sulfur containing feedstock, wherein said feedstock is desulfurized.

19. The process of claim 18, wherein said structural promoter provides acidic or alkaline properties to said catalyst.

20. The process of claim 18, wherein said structural promoter is alumina and wherein:
   the amount of structural promoter is from 0.2 to 5 wt. %;
   the nickel surface area is between 10 and 65 m$^2$/g catalyst;
   the structural promoter is derived from clay, metasilicate, colloidal silica, waterglass or sililic acid ether;
   the BET surface area is at least 15 m$^2$/g;
   at least 80% of the nickel atoms is present in the metallic form;
   the structural promoter provides acidic or alkaline properties to the catalyst.

* * * * *

UNITED STATES PATENT AND TRADEMARK OFFICE
CERTIFICATE OF CORRECTION

PATENT NO. : 6,524,994 B1
DATED : February 25, 2003
INVENTOR(S) : Bernard Hendrik Reesink et al.

It is certified that error appears in the above-identified patent and that said Letters Patent is hereby corrected as shown below:

Column 2,
Line 62, "nitrites" should read -- nitriles --.

Signed and Sealed this

Fifteenth Day of June, 2004

JON W. DUDAS
*Acting Director of the United States Patent and Trademark Office*